(12) United States Patent
Tan et al.

(10) Patent No.: US 10,933,526 B2
(45) Date of Patent: Mar. 2, 2021

(54) METHOD AND ROBOTIC SYSTEM FOR MANIPULATING INSTRUMENTS

(71) Applicant: General Electric Company, Schenectady, NY (US)

(72) Inventors: Huan Tan, Clifton Park, NY (US); Weston Blaine Griffin, Niskayuna, NY (US); Lynn Ann DeRose, Gloversville, NY (US); Yi Xu, Menlo Park, CA (US); Ying Mao, Burlingame, CA (US); Balajee Kannan, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 362 days.

(21) Appl. No.: 15/960,242

(22) Filed: Apr. 23, 2018

(65) Prior Publication Data

US 2019/0321969 A1    Oct. 24, 2019

(51) Int. Cl.
*B25J 9/16* (2006.01)
*B25J 15/06* (2006.01)
*B25J 11/00* (2006.01)

(52) U.S. Cl.
CPC .............. *B25J 9/161* (2013.01); *B25J 9/1664* (2013.01); *B25J 9/1679* (2013.01); *B25J 9/1697* (2013.01); *B25J 11/005* (2013.01); *B25J 15/0608* (2013.01); *G05B 2219/39393* (2013.01); *G05B 2219/39567* (2013.01); *G05B 2219/40053* (2013.01); *G05B 2219/40564* (2013.01)

(58) Field of Classification Search
CPC ......... A61B 34/30; A61B 34/20; A61B 34/37; A61B 2017/2927; A61B 2090/0811; A61B 2017/0046; A61B 34/76; A61B 2017/00115; A61B 17/00234; A61B 34/74; A61B 90/361; A61B 90/37; A61B 17/00; A61B 2017/00473; A61B 17/29; A61B 17/32; A61B 1/00009; A61B 17/3209; A61B 5/742; A61B 6/466; A61B 90/00; B25J 9/1697; B25J 15/0019; B25J 9/0084; B25J 13/006; B25J 13/065; B25J 15/00; B25J 19/02; B25J 9/0081; B25J 9/1682; B25J 11/00; B25J 11/0005; B25J 13/02; B25J 13/08; B25J 13/082; B25J 13/084; A61G 13/1235; G06T 2207/10068

See application file for complete search history.

(56) References Cited

U.S. PATENT DOCUMENTS 8,108,072 B2    1/2012 Zhao et al.
8,418,073 B2    4/2013 Mohr et al.
(Continued)

OTHER PUBLICATIONS

Xu et al., A vision-guided robot manipulator for surgical instrument singulation in a cluttered environment, 2014, IEEE, p. 3517-3523 (Year: 2014).*

(Continued)

*Primary Examiner* — McDieunel Marc
(74) *Attorney, Agent, or Firm* — Fletcher Yoder, P.C.

(57) ABSTRACT

An approach relates to manipulation of tools or instruments in the performance of a task by a robot. In accordance with this approach, sensor data is acquired and processed to identify a subset of instruments initially susceptible to manipulation. The instruments are then manipulated in the performance of the task based on the processed sensor data.

18 Claims, 6 Drawing Sheets

(56) References Cited

U.S. PATENT DOCUMENTS

| | | | |
|---|---|---|---|
| 8,491,603 B2 | 7/2013 | Yeung et al. | |
| 8,567,880 B2 | 10/2013 | Treat et al. | |
| 8,753,059 B2 | 6/2014 | Baker | |
| 9,138,895 B2 | 9/2015 | Melikian | |
| 9,259,844 B2 | 2/2016 | Xu et al. | |
| 2009/0326322 A1* | 12/2009 | Diolaiti | A61B 1/3132 600/112 |
| 2012/0071892 A1* | 3/2012 | Itkowitz | B25J 9/1612 606/130 |
| 2013/0041368 A1* | 2/2013 | Cunningham | A61B 34/76 606/34 |
| 2014/0088410 A1* | 3/2014 | Wu | A61B 34/20 600/424 |
| 2014/0200851 A1* | 7/2014 | Weir | A61B 34/30 702/182 |
| 2016/0314710 A1* | 10/2016 | Jarc | G09B 23/285 |
| 2017/0181808 A1* | 6/2017 | Panescu | A61B 34/37 |
| 2018/0200004 A1* | 7/2018 | Carnes | A61B 90/37 |
| 2019/0083190 A1* | 3/2019 | Graves | A61B 34/70 |
| 2019/0207911 A1* | 7/2019 | Wiener | G06F 8/65 |
| 2020/0205903 A1* | 7/2020 | Srinivasan | A61B 34/20 |
| 2020/0205913 A1* | 7/2020 | Carnes | A61B 34/76 |

OTHER PUBLICATIONS

Tan et al., An integrated vision-based robotic manipulation system for sorting surgical tools, 2015, IEEE, p. 1-6 (Year: 2015).*

Xu et al., Robotic Handling of Surgical Instruments in a Cluttered Tray, 2015, IEEE, p. 775-780 (Year: 2015).*

Estebanez et al., Surgical tools pose estimation for a multimodal HMI of a surgical robotic assistant, 2011, IEEE, p. 2121-2126 (Year: 2011).*

Xu Yi, et al.; "A vision-guided robot manipulator for surgical instrument singulation in a cluttered environment," IEEE International Conference on Robotics and Automation (ICRA), pp. 3517-3523, Hong Kong, 2014.

Tan, Huan, et al.; "An integrated vision-based robotic manipulation system for sorting surgical tools," IEEE International Conference on Technologies for Practical Robot Applications (TePRA), pp. 1-6, Woburn, MA, 2015.

* cited by examiner

METHOD AND ROBOTIC SYSTEM FOR MANIPULATING INSTRUMENTS

STATEMENT REGARDING FEDERALLY SPONSORED RESEARCH & DEVELOPMENT

This invention was made with Government support under contract number VA118-12-C-0051. The Government has certain rights in the invention.

BACKGROUND

The subject matter disclosed herein relates to vision-based approaches for use in robotic systems to facilitate manipulation of tools and instruments.

Various entities may employ robots or other autonomously controlled devices in various environments for the performance of tasks in the respective environment. For example, such devices may be employed to move or deliver items within the environment, to sort items for future use, to clean or inspect portions of the environment, to operate instrumentation or equipment within the environment, or to assist humans in the environment with various tasks. Many of these tasks require some form of robotic manipulation of items in the vicinity of the robot as part of the task.

However, various challenges exist with respect to allowing robotic manipulation of items. For example, uncertainty with respect to the environment and/or instrumentation may pose a challenge. Similarly, the ability of the robot to grasp or pick up an item in a robust and accurate manner may be problematic. The handling of large or small items may also pose a challenge, as may interactions in which a human collaborator is involved. These various challenges may impact the ability of robotic manipulation of tools, instruments, and so forth, to be employed in a task-based context.

BRIEF DESCRIPTION

In one embodiment, a processor-implemented method for manipulating one or more objects is provided. In accordance with this method, sensor data related to a plurality of instruments in an environment in which a robot is located is acquired. The sensor data is processed to identify one or more non-occluded instruments in the plurality of instruments. One or both of a manipulator and an effector of the robot are operated to manipulate at least one of the non-occluded instruments based on a task assigned to the robot.

In a further embodiment, a processor-implemented method for identifying non-occluded items is provided. In accordance with this method, an image representation of a plurality of instruments is acquired. One or more instruments from among the plurality of instruments in the image representation is identified. A pose is estimated for at least the identified instruments in the image representation. Occlusion of at least the identified instruments is inferred to identify one or more non-occluded instruments.

In an additional embodiment, a robotic manipulation system is provided. In accordance with this embodiment, a robot is provided that is configured to manipulate instruments. The robot comprises: one or more sensors configured to generate image data of at least a portion of the environment in which the robot is located; a manipulator configured to be moved with respect to instruments in the performance of a task; and an effector positioned on the manipulator and configured to interact with the instruments in the performance of the task. In addition, the robotic manipulation system includes a processing component configured to: process the image data to identify one or more non-occluded instruments from among a plurality of instruments; and operate one or both of the manipulator and the effector of the robot to manipulate at least one of the non-occluded instruments based on the task.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, robots or other autonomously controlled devices may be employed in various environments for the performance of tasks. For example, such devices may be employed to move or deliver items within the environment, to clean or inspect portions of the environment, to operate instrumentation or equipment within the environment, to sort items or instruments for a pending task, or to otherwise assist humans in the environment with various tasks. Many of these tasks require some form of robotic manipulation of items in the vicinity of the robot as part of the task.

Certain challenges, however, exist with respect to allowing robotic manipulation of items. Example of such challenges include, but are not limited to: uncertainty with respect to the environment and/or instrumentation; the capability of the robot to grasp or pick up an item in a robust and accurate manner; the handling of large or small items; and interactions in which a human collaborator is involved.

To address certain of these challenges, a highly integrated robotic system may be employed, as discussed herein, that is equipped with various sensors and actuators. Motion and action planning a given environment and/or instruments may be based on sensor information obtained by the robot. Such sensor information may include, but is not limited to visual information (e.g., information obtained using an optical (such as RGB or RGB-D), infrared, or ultraviolet camera or sensor), lidar, sonar, force/torque sensor, and so forth. In such an approach, vision-based motion planning and/or control increases the success rate of correctly manipulating instruments. However, such sensor-based information may introduce errors in computing the manipulation point due to noisy sensing, processing, and estimation. The present approaches discussed herein address certain of these challenges and/or deficiencies with respect to robotic manipulation of tools or instruments, such as in an environment shared with humans.

As used herein, the terms robots or robotic devices include, but are not limited to, ground-based mobile robots, including those with legs, wheels, tracks, etc. Such devices may also include actuators or other movable components (e.g., grippers, arms, and so forth) that are also programmable and movable to perform tasks. It should be understood that devices characterized as robots herein encompass any suitable autonomously moving devices that are capable of programmable movement with no or limited human oversight or of remote control by an automated system or controller. Such programmable movement, when employed, can be based on either locally generated path waypoints or guidance or path guidance and waypoints generated by a remote system (e.g., a server or controller) and communicated to the robot. Thus, as used herein, such devices move during an operational phase or period entirely or primarily without direct human intervention or control or with limited or partial human intervention or oversight. Though ground-based robots are primarily discussed herein, the present approaches may also be relevant to navigation and and/or task planning in the context of unmanned aerial vehicles (UAVs), including fixed wing and rotary wing vehicles as well as, unmanned submersible vehicles (USVs), which may swim or move along the floor of the body of liquid within the context of the teachings of the present discussion.

Further, to the extent the term "path" is used herein, it should be appreciated that this term encompasses one-dimensional (1D) (such as along a track), two-dimensional (2D) (such as along a defined or undefined planar route), three-dimensional (3D) (such as movement in the air or generally along a plane but incorporating vertical elements, including stairs, elevators, conduits, and so forth), or four-dimensional (4D) (such as where there are defined temporal aspects that may characterize a velocity, acceleration, or a time on station at a waypoint) aspects. Such as path, as used herein relates to a route or other movement plan along which a robot moves as part of performing one or more tasks as part of an automated or semi-automated process. Thus, a "path" as used herein may be characterized as any 1D, 2D, 3D, or 4D route or path along which a device such as a robot is moved to perform one or more assigned tasks. Such a path may be adaptive, such as dynamically adapting in response to sensor data acquired by the robot of the local environments in real- or near real-time, and may consist of one or more waypoints along which the robot proceeds in an ordered fashion, with the sequence and location of the waypoints defining the path or route. It should be appreciated that such a path may also incorporate not only temporal and/or spatial locations, but also action instructions to be taken at points and/or times defined on the path, such as delivering or manipulating tools as discussed herein.

To facilitate explanation and provide useful real-world context, various examples of indoor environments may be referenced herein, such as offices, schools, hospitals factories, and so forth. As may be appreciated however, the present approach may be broadly applicable to any environment and/or task context in which robots are employed to manipulate, sort, deliver, move, or otherwise interact with instruments. As used herein, the term "instruments" may be understood to encompass, tools, instruments, controls, or any item or device relevant to a task assigned to the robot and manipulable by the robot in performing the task. Such instruments may be freely movable within the environment, such as capable of being picked up, moved, and so forth. As may be appreciated, any examples described herein are provided merely to facilitate explanation, and the present approach is suitable for use in any context involving manipulation or interaction with environmental items. The present approach, therefore, is not intended to be limited to the context of the present examples.

Figure 1:
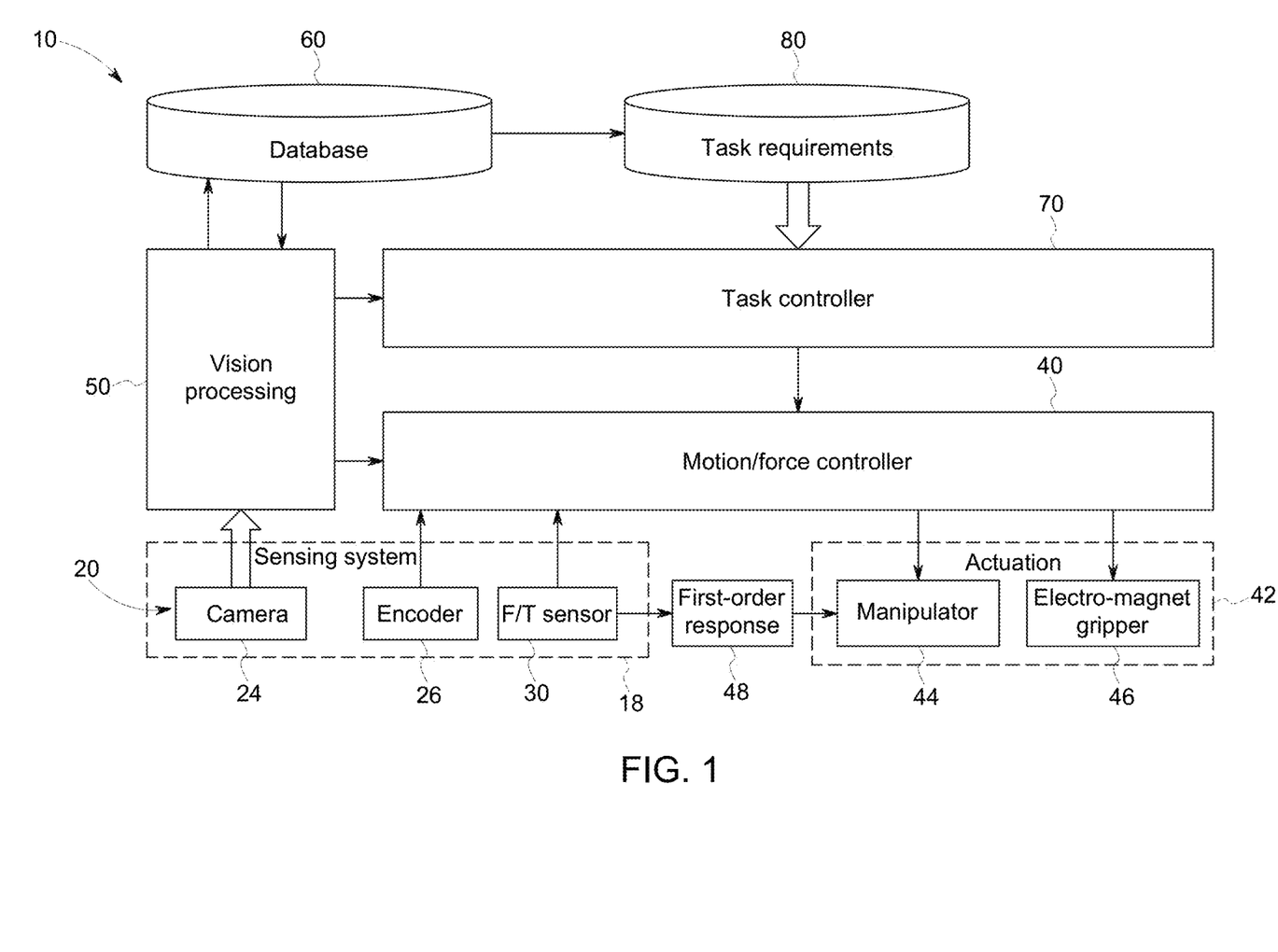
FIG. 1 is a schematic of a robotic manipulation system, in accordance with aspects of the present disclosure.

With the preceding in mind, and turning to the figures, FIG. 1 depicts aspects of a robotic manipulation system 10 suitable for moving about an environment (such as via a drive system) and manipulating or interacting with items in the environment. In one implementation the robot is a collaborative robot having a collaborative control mechanism, meaning humans can work closely with it. In such an implementation, the robot can detect external forces and can adjust its motion and forces accordingly to avoid collisions and protect itself and the environment.

FIG. 1 depicts a schematic of one embodiment of a robotic manipulation system 10. It should be understood, that other embodiments of the robot manipulation system 10 are envisaged and may include additional components, fewer components, and/or different combinations of components than those illustrated. In practice, certain of the features shown in FIG. 1 (such as a manipulator 44 and gripper 46) may be provided as part of a robot 12 (FIG. 2) while others may be provided external to the robot, such as part of one or more non-robot servers or computer systems. In other embodiments, all processing and control aspects illustrated may be provided as part of the robot.

For example, the robotic manipulation system 10 may, via a network or cellular interface, include or communicate with one or more remote servers (e.g., cloud server) to facilitate remote operation and/or transmission of sensed data or state information related to the robot and/or environment. In some embodiments, the robot or sensors external to the robot may provide sensor data to the remote server to convey information about the environment currently sensed by the robot, which may be relevant to the operation of the robot and/or task performance by the robot.

A sensing system 18 may include one or more sensors (e.g., tactile sensors, chemical sensors, temperature sensors, laser/LIDAR, sonar, cameras, a red, blue, green, depth (RGB-D) camera) configured to sense various qualities and collect data (e.g., environmental information) during operation of the robot and/or performance of a task by the robot. The sensors may be used to acquire sensed data corresponding to the sensor type and observation range that conveys information about the environment where the robot is located.

In the depicted example the sensing system 18 is depicted as including various types of sensors 20, including a camera 24 (e.g., an RGB or RGB-D (red, blue, green, depth) camera), an encoder 26 (configured to sense one or more parameters of one or more motors (e.g., rotational speed, linear displacement, and so forth), which may in turn be provided to a control system), and a force/torque sensor 30.

Figure 2:
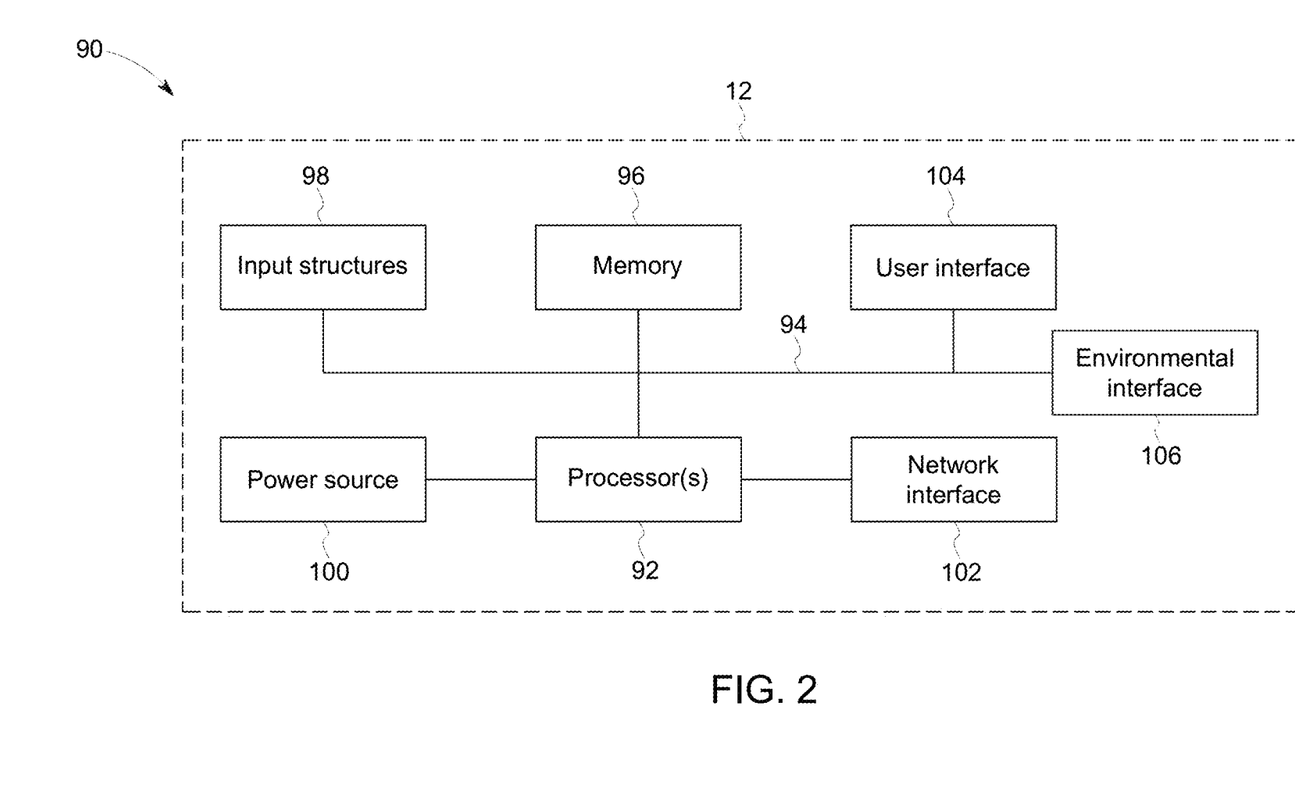
FIG. 2 is a block diagram of a processor based system suitable for use with the instrument manipulation system of FIG. 1, in accordance with aspects of the present disclosure.

The robot manipulation system 10 is illustrated as including various control systems, which may be implemented using, or as part of, one or more processor-based systems as discussed in greater detail with respect to FIG. 2. For example, such control systems may be based on or include one or more memory components and one or more processors in communication with the memory components.

By way of example, a motion/force controller 40 may receive a signal from the one or more encoders 26 (and/or other sensors or systems as discussed herein) and may output a control signal to the one or more actuatable components 42 of the robot, such as a manipulator 44 and/or electromagnet gripper 46. For instance, a control signal from the motion/force controller 40 may control operation of a motor or magnet used in the operation or actuation of such components.

Similarly, a vision processing system 50 may receive data from the sensing system 18, such as from camera 24. As discussed in greater detail below, the vision processing system 50 may also generate outputs related to the operation of the motion/force controller 40, a task controller 60, and/or a database 70. In the depicted example, the database 60 may be interacted with to identify one or more task requirements 80 that can be conveyed to the task controller 70 for use in implementing a given task.

As noted above, the robot (and any remote servers or devices with which the robot communicates) may be provided as a processor-based system in which one or more microprocessors execute routines and/or algorithms to provide the functionality described herein. Before providing additional detail into operation of the robotic manipulation system 10, it may be beneficial to briefly provide an example of aspects of a processor-based system 90 that may include components or features found in one or both of a robot 12 and/or remote server (though the robot 12 is shown by way of example).

For example, turning to FIG. 2, such devices or systems may contain components as shown in the figure, which depicts a block diagram of example components of a processor-based system 90. As used herein, a processor-based system 90 may be implemented as a robot 12 (shown) or as one or more computing systems, including laptop, notebook, desktop, tablet, or workstation computers, as well as server type devices or portable, communication type devices, such as cellular telephones, and/or other suitable computing devices, and or all of which may be used in the robotic manipulation system 10.

As illustrated, the processor-based system 90 may include various hardware components, such as one or more processors 92, one or more busses 94, memory 96, input structures 98, a power source 100, a network interface 102, a user interface 104, and/or other computer components useful in performing the functions described herein.

The one or more processors 92 are, in certain implementations, microprocessors (e.g., CPUs, GPUs, and so forth) configured to execute instructions stored in the memory 96 or other accessible locations. Alternatively, the one or more processors 92 may be implemented as application-specific integrated circuits (ASICs), field-programmable gate arrays (FPGAs), and/or other devices designed to perform functions discussed herein in a dedicated manner. As will be appreciated, multiple processors 92 or processing components may be used to perform functions discussed herein in a distributed or parallel manner.

The memory 96 may encompass any tangible, non-transitory medium for storing data or executable routines (including routines and/or algorithms for processing sensed, planning motions, making decisions, and controlling the manipulator 44 and/or gripper 46, or otherwise facilitating manipulation of instruments or objects as discussed herein), including volatile memory, non-volatile memory, or any combination thereof. Although shown for convenience as a single block in FIG. 2, the memory 96 may actually encompass various discrete media or types of media in the same or different physical locations. The one or more processors 92 may access data in the memory 96 via one or more busses 94.

The input structures 98 are used to allow a user to input data and/or commands to the device 90 and may include mice, touchpads, touchscreens, keyboards, VR controllers, motion or optical sensors, microphones, and so forth. The power source 100 can be any suitable source for providing power to the various components of the processor-based system 90, including line and battery power. In the depicted example, the device 90 includes a network interface 102. Such a network interface 102 may allow communication with other devices on a network using one or more communication protocols. In the depicted example, the processor-based system 90 includes a user interface 104, such as a display configured to display images or data and/or speakers configured to play sound or acoustic data provided by the one or more processors 92. In addition, the processor-based system 90, here depicted as a robot 12, may include environmental interface components 106, such as the manipulator(s) 44 and gripper(s) 46 discussed herein.

As will be appreciated, in a real-world context a processor-based system 90, may be employed to implement some or all of the present approach, such as performing the functions of a remote or communications server and/or robot 12 or other processing devices used operating or monitoring a robot 12 that performs tasks involving the manipulation of tools or objects.

With the preceding comments in mind, and returning to FIG. 1, the interrelationship and operations of the various components introduced above will be discussed. As described herein, the system 10 is a robotic manipulation system used to facilitate the manipulation and/or handling of instruments by a robot 12 in the performance of a task. One or several processors may be used to provide on-board computing resources for the robot 12 to process sensed data (such as from the sensing system 18), plan and execute motions, make decisions, and to otherwise control the robot and manipulator (e.g., manipulator arms) or grippers present on the robot 12.

To facilitate such robotic manipulation, examples of a system 10, components of such a system, and their operation will be described in greater detail. As noted above, the present approach relates to the manipulation of tools, instruments, parts, and so forth by a robot 12 in the performance of a task by the robot 12. For example, such tasks may include assisting in a surgical or repair procedure in which the robot identifies, grabs, and transfers a tool or needed item to a human, collecting and transferring specific items from one location to a different location, and/or handling or moving dirty or unhygienic tools or items so that a human can avoid contacting the items.

With this in mind, and turning to FIG. 1, such a robot 12 will include some form of manipulation component capable of being moved relative to the robot 12 and its environment and of interacting with (e.g., moving, lifting, grabbing, and so forth) a target item, such as a tool or instrument of interest. Such manipulation components may be actuated, such as to be moved in one or more dimensions and/or be engaged with the item of interest. Such movement and/or engagement may be mechanical or electromagnetic in nature or some combination of mechanical and electromagnetic. By way of example, FIG. 1 illustrates the robot 12 as including a manipulator 44 having an electromagnetic gripper 46 for interacting with objects in the environment.

In general, robot manipulators 44 (e.g., a robot or manipulator arm) are created from a sequence of link and joint combinations. A manipulator 44 is used to generate motions in the environment and either the gripper 46 (which may be at a terminus of the manipulator 44) or the body of the manipulator 44 are used interact with objects and perform tasks. By way of example, in one embodiment a robot manipulator(s) 44 is a multiple-degree-of-freedom mechanism.

In addition, the robot 12 may include an electromagnet end-effector (e.g., an electromagnetic gripper 46). Such a gripper 46 may be useful to address picking error or other low accuracy issues related to the robot's ability to pick up or otherwise manipulate objects. In one implementation, such an electromagnetic gripper 46 tolerate error and imprecise detection in the system 10 and increase the success rate of the overall system.

For example, in one embodiment the electromagnetic gripper 46 is configured to grip an instrument in a cluttered environment given a two-dimensional (2D) reference point as the picking location. In this example, the electromagnetic gripper 46 has three passive joints: a prismatic joint along the z-axis and two revolute joints along the x and y axes. Each joint has a coil spring attached to the shaft; making these joints compliant. A rotary damper is attached to each of the revolute joint shafts to prevent instrument oscillation after picking up and during transport. An electromagnet is attached at the bottom of the gripper. Such an electromagnetic gripper 46 can handle error attributable to the vision system (discussed below).

With respect to the vision system, one or several high-resolution cameras 24 may be mounted in the environment or on the robot 12 to provide visual feedback. The positions and/or orientation of the cameras 24 is flexible depending on the task requirements and may include panning or otherwise moving or zooming cameras 24 as needed.

In the depicted example of FIG. 1, the sensor data (e.g., image data such as pictures, video, and so forth) taken from the camera(s) 24 are video processed (such as via a processor-based system 90 as discussed herein) to generate information regarding one or more targets-of-interest (e.g., task-related tools, instruments, controls, and so forth). In one embodiment, such information will be sent to the robot 12 for further decision-making and motion planning. Thought the present example illustrates the use of cameras 24 and vision processing, in other implementations other types of sensor data (e.g., lidar, sonar, RGB-D, and so forth) may be acquired and appropriately processed to generate the information regarding one or more task-related targets-of-interest.

With respect to the software architecture of the robotic manipulation system 10, in one embodiment the system 10 may be characterized as a Perception-Planning-Action system. In such an example, the perception aspect (e.g., some or all of the sensing system 18) includes one or more cameras (24) mounted on the robot 12 (e.g., on the front of the robot 12) for recognizing and locating one or more instruments of interest for a task (e.g., surgical tools to be handed to a surgeon, to be collected for delivery to a sanitization station, to be sorted on a tray, and so forth). The perception aspect may also include encoders 26 on the robot arm (e.g., manipulator 44) for kinematic and dynamic sensing and computing, and/or a force sensor or force/torque (F/T) sensor 30 on the end-effector (e.g., electromagnetic gripper 46) for "grasping" validation.

With respect to the planning aspect, planning is related to scheduling and controlling robot operation involving manipulation of a tool or item. Such planning may include some or all of higher level task planning (as may be implemented at the task controller 70), middle level motion planning (as may be implemented at the motion/force controller 40), and lower level reactive planning (as may be implemented at the motion/force controller 40), which each deal with different goals at different levels of abstraction of the operation.

In the depicted example, one or more databases 60 store information (e.g., processing parameters and thresholds, task requirements, and so forth) for vision processing 50 and task planning (e.g., as implemented at task controller 70). In one implementation, the database(s) 60 is the memory component for the overall system 10, and stores information for robots 12 to use, including data or parameters related to recognizing and identifying the types and positions of instruments to be manipulated as part of a task (e.g., surgical tools). In this example, the vision processing component 50 may utilize pre-stored templates for the instruments related to a respective task, such as for surgical tools in a surgery support task. In the database 60, the templates may be stored as images of the edges of the instruments in question. As task-related instruments are added (such as when new tasks are added or tasks are updated), the database 60 is also updated with the appropriate template images.

The vision processing 50 aspect itself is configured to process the visual information obtained from the camera(s) 24. While vision processing and image data are contemplated in this example, it should be appreciated that this aspect may more generally encompass sensed data processing where the sensed not is not image data, such as lidar, sonar, and so forth. However, to facilitate and simplify explanation, the present example of vision processing of image data is employed, though it should be understood that such processing may encompass sensed data not typically characterized as image or vision data.

With respect to vison processing, the major task is to find the 3D/6D poses of targets-of-interest in the environment. Initially, the visual processing may identify the contours of the instruments present in the environment. Learned models stored in the database 60 may then be employed to find the targets-of-interest in the environment. After that, a pose estimation algorithm may be employed to compute 6D poses of the one or more targets-of-interest. The occlusion of the instruments in question may then be determined, and an instrument that can or should be manipulated first is then determined.

In addition, with respect to the planning aspect, the database(s) 60 may also store task primitives to be used in generating motion sequences, and so forth. By way of example, in one implementation, a task primitive-based planning system may be employed. In such an example, the database 60 may store some basic task primitives: e.g., Start, Stop, Pause, Vision Processing, Returning, Moving-Up, Moving-Down, Moving-Forward, Moving-Backward, Moving-Left, Moving-Right, Reaching, Grasping, Releasing, and so forth. These primitives may be provided to the task controller and/or downstream motion or motion/force controller 40 to generate motion sequences composed of the available primitives.

In one such implementation, the task controller 70 sends out control signals (which may be based on stored task primitives or motion sequences generated using such task primitives) to trigger different components directly and indirectly. In such an example, the task controller 70 may include two aspects: (1) task planning and scheduling; and (2) task monitoring and control. These aspects may be implemented, in certain implementations, in a Finite State Machine (FSM) and a Decision Making Mechanism (DMM) accordingly.

In response to commands received via a communication interface, the task controller 70 may generate a sequence of task primitives (i.e., a motion sequence) for a robot 12 to execute. By way of example, a sorting task as used herein is a type of pick-and-place manipulation. A typical sequence of task primitives for use in such a pick-and-place manipulation task may be:
Vision Processing→Moving-Up→Moving-Right→Moving-Down→Reaching→Force Detection→Pausing-→Grasping→Moving-Up→Moving-Left→Moving-Down-→Releasing
Thus, in this example, the sequence of primitives, when performed in sequence, causes a vision processing event to occur in which an instrument of interest is identified, the manipulator 44 is moved in sequence up, right, and down to position the gripper 46, the gripper 46 reaches for the instrument of interest based on this positioning until contact is made (as determined based on force feedback), the gripper 46 grasps the instrument, the manipulator 44 is then moved in sequence up, left, and down, after which the gripper 46 releases the instrument.

As evident in this example, implementation of a motion sequence generated by the task controller 70 may be performed at least in part by a motion controller or motion/force controller 40, as shown in FIG. 1. In this example, the motion controller 42 drives the robot 12 or structures of the robot 12 to move to the desired goal position of each planned task primitive. In one implementation a proportional-integral-derivative (PID) controller this system, may be employed to minimize the distance between the current robot configuration and the desired configuration. Though shown in the figure as a single component, motion and force control may be provided by separate controllers which may reside in different physical and logical spaces. For example, in one embodiment, force control may be embedded in or otherwise provided as part of the robot manipulator 44.

In one implementation, force control of the end effector (e.g., electromagnetic gripper 46) may be accomplished by modulating current to an electromagnet in the gripper by a servomotor drive to generate a gripping force sufficient to pick up the target instrument. A picking force suitable for each instrument which may be encountered may be empirically determined and stored (such as on a database 60) in a lookup table indexed by an instrument identifier. The instrument identifier for one or more observed instruments may be determined using the vision system in real-time or near real-time.

In an example of an embodiment, to control the gripper 46 a microcontroller is used as a bridge between the gripper electronics and a separate Robotic Operating System (ROS) running on the robot 12. A load cell may also be used to measure the contact force between the electromagnet and the instrument. In this example, the microcontroller reads the force sensor through an analog-digital (AD) channel and sends a pulse width modulation (PWM) signal to a motor shield to modulate the current in the electromagnet.

As shown in the example of FIG. 1, a first-order response sub-system 48 or module (which may be implemented as a processor-implemented routine or algorithm) may also be provided. In this example, the first-order response routines make rapid decisions and responses to avoid damage to the robot 12, the environment (e.g., items or humans in the environment in which the robot 12 is located), and the devices.

For instance, in the sorting example described above, one concern is that the robot 12 hits a table or other support holding the instruments with its gripper 46. This may harm the functionality of the gripper 46 and may cause other issues in the sorting task. In this example, the first-response logic may pro-actively or reactively trigger a Moving-Up motion to avoid additional damage when the force detected on the gripper 46 is larger than a threshold value, such as a value determined to be indicative of a collision. Such a fast motion generation response may thereby reduce the chance of damaging the gripper 46 and the robot 12.

With the preceding in mind, and by way of a real-world example in a use scenario, one task throughout the sterilization process in a surgical setting is the need to pick up the instruments and sort them into several empty containers based on the instrument types (e.g., scissors, tweezers). When surgical instruments are returned from operating rooms, instruments are typically simply piled in a container without ordering. One challenge may be that there may be tens of dirty or otherwise unsterile tools in a tray. The number, the positions, the orientations, types, and the topological configurations of the tools are typically uncertain and different types of instruments may require different handling procedures.

With respect to this example, the vision system (e.g., cameras 24, vision processing 50) may identify surgical instruments in a container (e.g., on a tray). The vision processing routines perform an occlusion reasoning step that determines what instruments are on top of the pile and not occluded by others (i.e., had no parts covered by another instrument. These non-occluded instruments were candidates for gripping and singulation. A grip point may then be determined and communicated to the robot manipulator 44. The robot picks up the selected surgical instrument by the grip point and places it in a designated area for the purpose of sorting or other task-specific purposes. This process is repeated until all instruments are removed from the container or other initial area.

Figure 3:
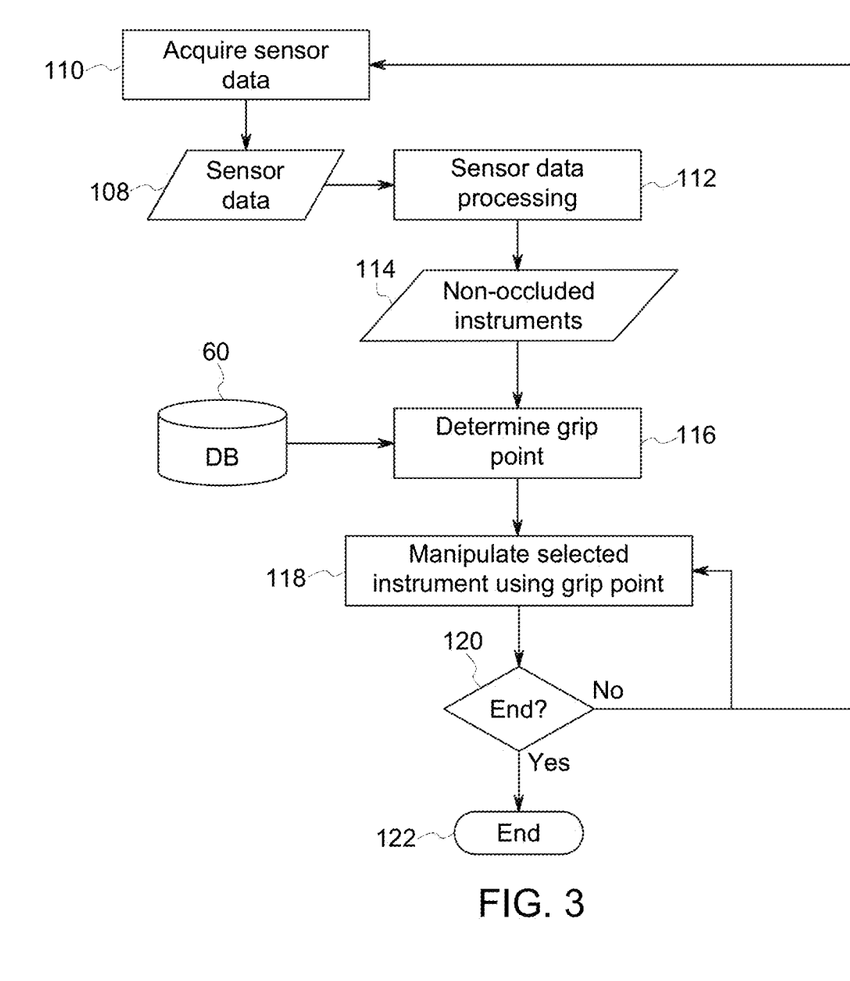
FIG. 3 depicts a process flow relating steps in processing sensor data to facilitate manipulation of instruments.

This example is generalized and illustrated by way of a process flow in FIG. 3, where sensor data 108, which may encompass vision data as well as other types of sensed data, is acquired (block 110) by suitable sensing modalities. The sensor data 108 (e.g., vision data) is processed (block 112) to identify one or more non-occluded instruments 114. A grip point is determined (block 116) for at least one of the non-occluded instruments 114, such as via accessing stored grip points for different instruments stored in a database 60. Based on the determined grip point, a selected non-occluded instrument 114 (such as the least occluded instrument) manipulated (e.g., grasped or gripped) (block 118) by its grip point, such as to move the selected instrument to another location. A determination may then be made whether the respective task involving instrument manipulation is concluded (decision block 120). If it is, the operation ends (block 122). If not, the process may reinitialize by acquiring new sensor data 108 or, based on the prior sensor data 108 if other non-occluded instruments 114 were identified, by manipulating the next non-occluded instrument 114 by its respective grip point.

Figure 4:
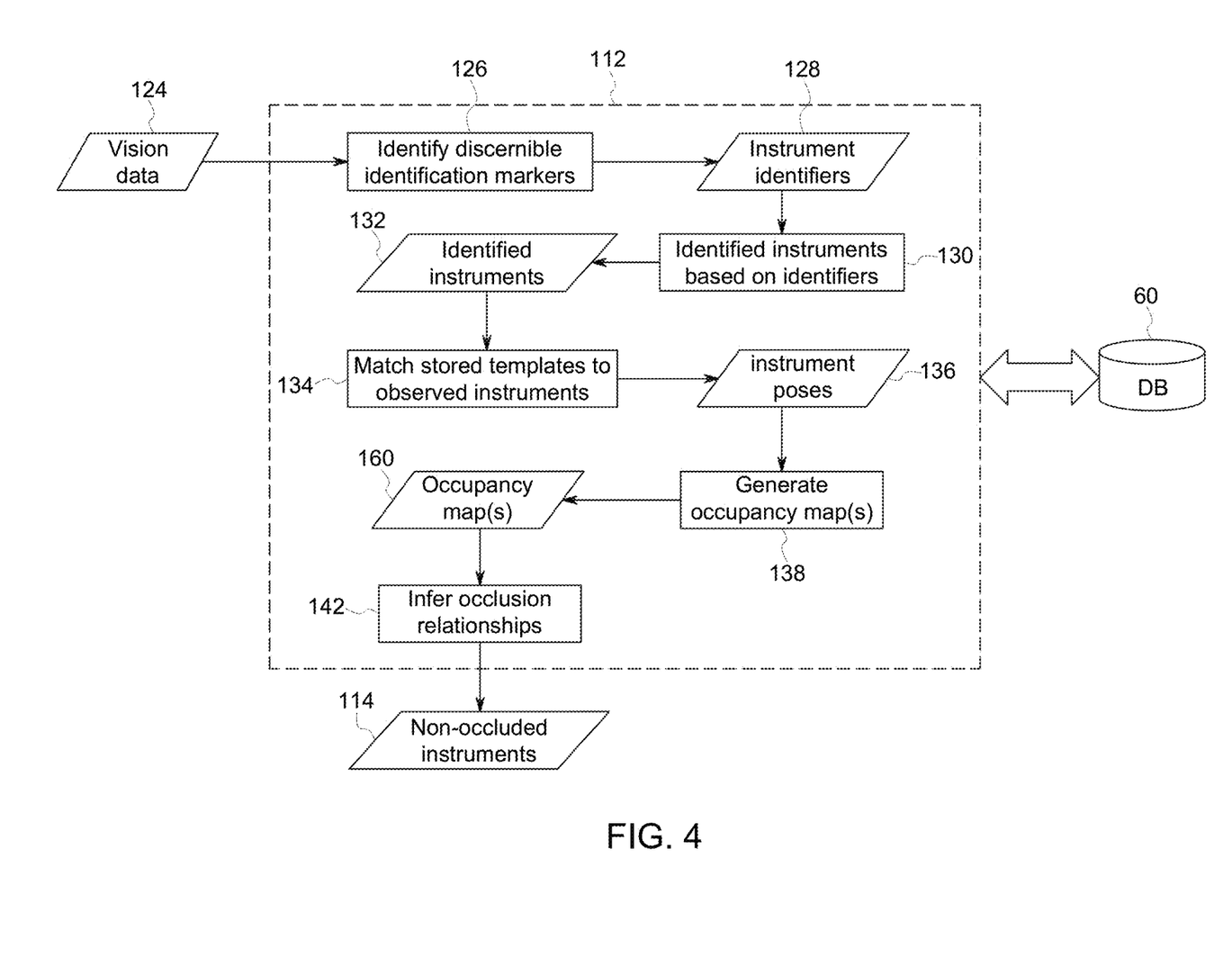
FIG. 4 depicts a process flow relating steps in processing vison data to determine one or more non-occluded instruments.

The sensor data processing step 112 of such an operation is further described in the context of instrument identification, pose estimation, and occlusion inference. In particular, FIG. 4 depicts a process flow of one example of sensor data processing steps 112 to identify non-occluded instruments 114 in the particular context of vision data 124.

Figure 5:
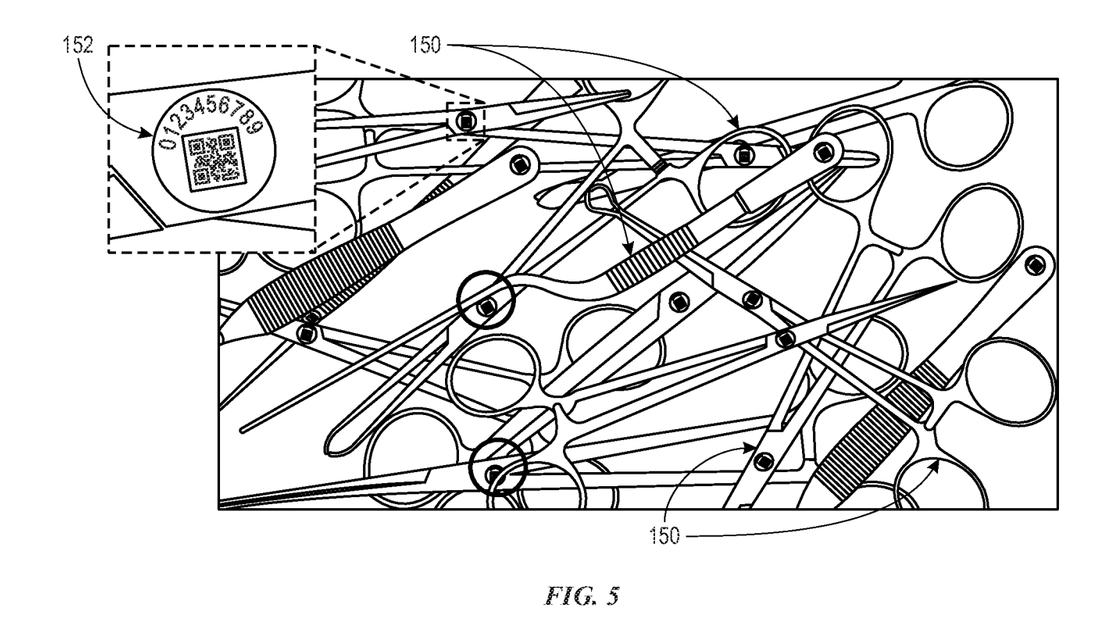
FIG. 5 depicts identification of instruments using identifying visual markings, in accordance with aspects of the present disclosure.

With respect to the identification step, such a step may be accomplished based on comparison of identified edges to respective templates, which may be stored in database 60. Alternatively, and as shown in FIGS. 4 and 5, some or all of the instruments 150 (FIG. 5) may be tagged or labeled with identification markers 128, such as visual markers including two- or three-dimensional bar codes 152, an example of which is shown in the inset enlargement of FIG. 5, or non-visual markers such as RFID tags. In such non-visual marker embodiments a corresponding reader or sensor may be provided on the manipulator 33, such as an RFID reader capable of interrogating and/or reading passive RFID tags. Turning back to FIG. 4, in one implementation employing a visual identification marker, a visible bar code (or other visible identifier) may be located and identified (block 126) in high-resolution images (e.g., vision data 124), though as noted above other types of sensed identification data may alternatively be used to identify the instruments. The instrument identifiers may then be processed to identify (block 130) one or more identified instruments 132, such as by reference to data stored in database 60.

For the identified instruments 132 the system 10 estimates a pose 136 (e.g., a 4-degree of freedom (DOF) pose (i.e., location, orientation, and scale)). This may be done by matching (block 134) a template of each identified instrument 132, which is stored in the database 60 in a learning stage, to its pose in the image of the container (i.e., vision data 124). The respective templates may be segmented by thresholding and removing small connected components. The foreground segmentation may be stored in the library as a mask.

By way of example, edges may be detected in both a template image and container image. A distance transform is computed on an edge map of the container image. In this manner, the distance between the transformed template edges and edges in the container image can be approximated quickly by summing up pixels at transformed template locations in the distance transform. In the study, downhill simplex was used to perform the non-linear optimization.

Figure 6:
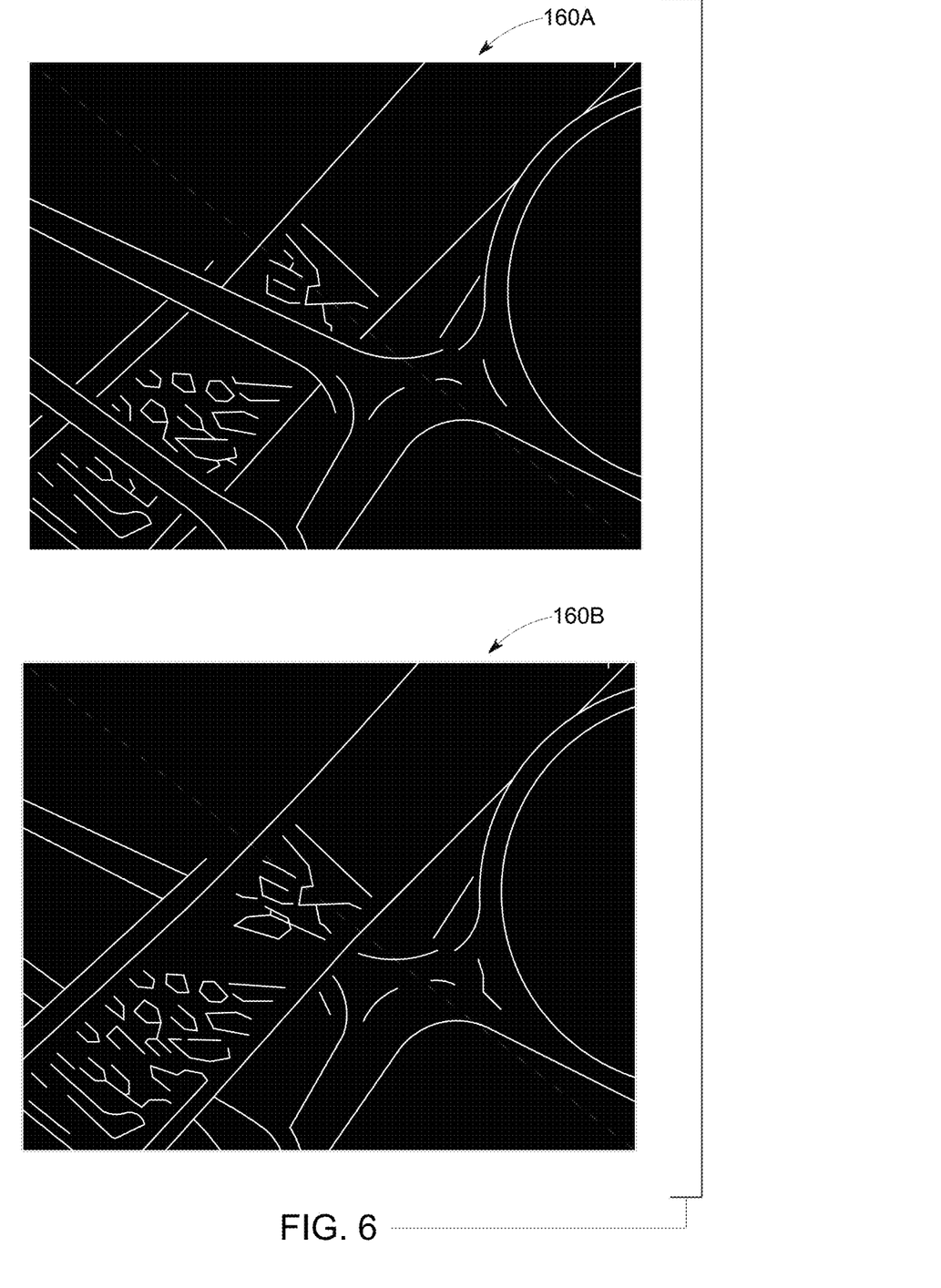
FIG. 6 depicts alternative occlusion maps, in accordance with aspects of the present disclosure.

Given the poses 136 of the identified instruments 132, the occlusion relationship between each pair of intersecting instruments is inferred (block 142), as show in FIG. 6. This determines which instruments are not occluded by others and thus are candidates for the gripper 46 to pick up next. In this example, an occupancy map 160 is computed (block 138) that models the intersections between the instruments. The occupancy map 160 in this example, is a single channel image. Each bit of a pixel is assigned to one instrument. For every pair of intersecting surgical instruments A and B, there are only two hypothetical occlusion relationships: A occludes B or B occludes A. For each pair, two images (160A, 160B) are synthesized, each of which corresponds to one of the two hypotheses (H1 and H2). It may be assumed in most cases that there is no occlusion cycle among instruments (e.g., A occludes B, B occludes C, and C occludes A).

Once all the occlusion relationships are determined, non-occluded instruments 114 may be determined algorithmically. A picking location for each instrument may be pre-specified, such as by being determined empirically by a human operator in the template creation stage. Thus, non-occluded instruments 114 may be picked up at their specified picking location and the process repeated until all instruments are processed, as illustrated in the process of FIG. 3.

Technical effects of the invention include the processing of sensor data (e.g., vision data) to identify non-occluded instruments in an assortment of instruments. Based on this identification, the non-occluded instruments may be manipulated in the performance of a task by a robot.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A processor-implemented method for manipulating one or more objects, comprising:
   acquiring sensor data related to a plurality of instruments in an environment in which a robot is located;
   processing the sensor data to identify one or more non-occluded instruments in the plurality of instruments, wherein processing the sensor data comprises:
      identifying one or more instruments of the plurality of instruments based on one or more radiofrequency identifiers present on the one or more instruments;
      estimating a pose for at least one of the one or more instruments based on identification of the one or more instruments; and
      inferring occlusion of the one or more instruments based on the pose to identify the one or more non-occluded instruments; and
   operating one or both of a manipulator and an effector of the robot to manipulate at least one of the one or more non-occluded instruments based on a task assigned to the robot.

2. The processor-implemented method of claim 1, wherein acquiring the sensor data comprises acquiring visual data of at least a portion of the environment in which the plurality of instruments is present.

3. The processor-implemented method of claim 1, wherein the plurality of instruments comprises tools used in the environment and wherein the task comprises sorting or moving the tools.

4. The processor-implemented method of claim 1, wherein identifying one or more additional instruments of the plurality of instruments comprises identifying one or more visual identifiers present on the one or more additional instruments.

5. The processor-implemented method of claim 1, wherein estimating the pose for the at least one of the one or more instruments comprises matching a template of each identified instrument with a corresponding pose of each identified instrument derived from the sensor data.

6. The processor-implemented method of claim 1, wherein inferring occlusion comprises generating one or more occupancy maps that model intersections between instruments.

7. The processor-implemented method of claim 1, wherein the steps of acquiring, processing and operating are repeated until all instruments of the plurality of instruments are manipulated in accordance with the task.

8. The processor-implemented method of claim 1, further comprising interacting with a database containing stored data to identify the one or more non-occluded instruments.

9. The processor-implemented method of claim 1, further comprising determining a grip point for a respective non-occluded instrument prior to manipulating the respective non-occluded instrument, wherein the effector grasps the respective non-occluded instrument by the grip point when manipulating the respective non-occluded instrument.

10. A processor-implemented method for identifying non-occluded items comprising:
  acquiring an image representation of a plurality of instruments;
  identifying one or more instruments from among the plurality of instruments in the image representation based on one or more radiofrequency identifiers present on the one or more instruments;
  estimating a pose for at least one of the one or more instruments based on identification of the one or more instruments; and
  inferring occlusion of the one or more instruments based on the pose to identify one or more non-occluded instruments.

11. The processor-implemented method of claim 10, wherein identifying the one or more instruments comprises accessing a database to retrieve an identity for the one or more instruments using the one or more radiofrequency identifiers.

12. The processor-implemented method of claim 11, comprising identifying one or more visual identifiers comprising two-dimensional bar codes or three-dimensional bar codes on the one or more instruments.

13. The processor-implemented method of claim 10, wherein estimating the pose for the at least one of the one or more instruments comprises matching a stored template of each identified instrument with a corresponding pose of each identified instrument in the image representation.

14. The processor-implemented method of claim 10, wherein inferring occlusion comprises generating one or more occupancy maps that model intersections between instruments.

15. A robotic manipulation system, comprising:
  a robot configured to manipulate instruments, the robot comprising:
    one or more sensors configured to generate sensor data of at least a portion of an environment in which the robot is located;
    a manipulator configured to be moved with respect to the instruments in performance of a task; and
    an effector positioned on the manipulator and configured to interact with the instruments in the performance of the task; and
  a processing component configured to:
    process the sensor data to identify one or more non-occluded instruments from among a plurality of instruments, wherein processing the sensor data comprises:
      identifying one or more instruments of the plurality of instruments based on one or more radiofrequency identifiers present on the one or more instruments;
      estimating a pose for at least one of the one or more instruments based on identification of the one or more instruments; and
      inferring occlusion of the one or more instruments based on the pose to identify the one or more non-occluded instruments; and
    operate one or both of the manipulator and the effector of the robot to manipulate at least one of the one or more non-occluded instruments based on the task.

16. The robotic manipulation system of claim 15, wherein identifying the one or more instruments comprises accessing a database to retrieve an identify for the one or more instruments using the one or more radiofrequency identifiers.

17. The robotic manipulation system of claim 15, wherein estimating the pose for the at least one of the one or more instruments comprises matching a template of each identified instrument with a corresponding pose of each identified instrument derived from the image data.

18. The robotic manipulation system of claim 15, wherein inferring occlusion comprises generating one or more occupancy maps that model intersections between instruments.

* * * * *